No. 770,935. PATENTED SEPT. 27, 1904.
C. A. SHUMATE.
MEASURE.
APPLICATION FILED MAR. 31, 1904.
NO MODEL.
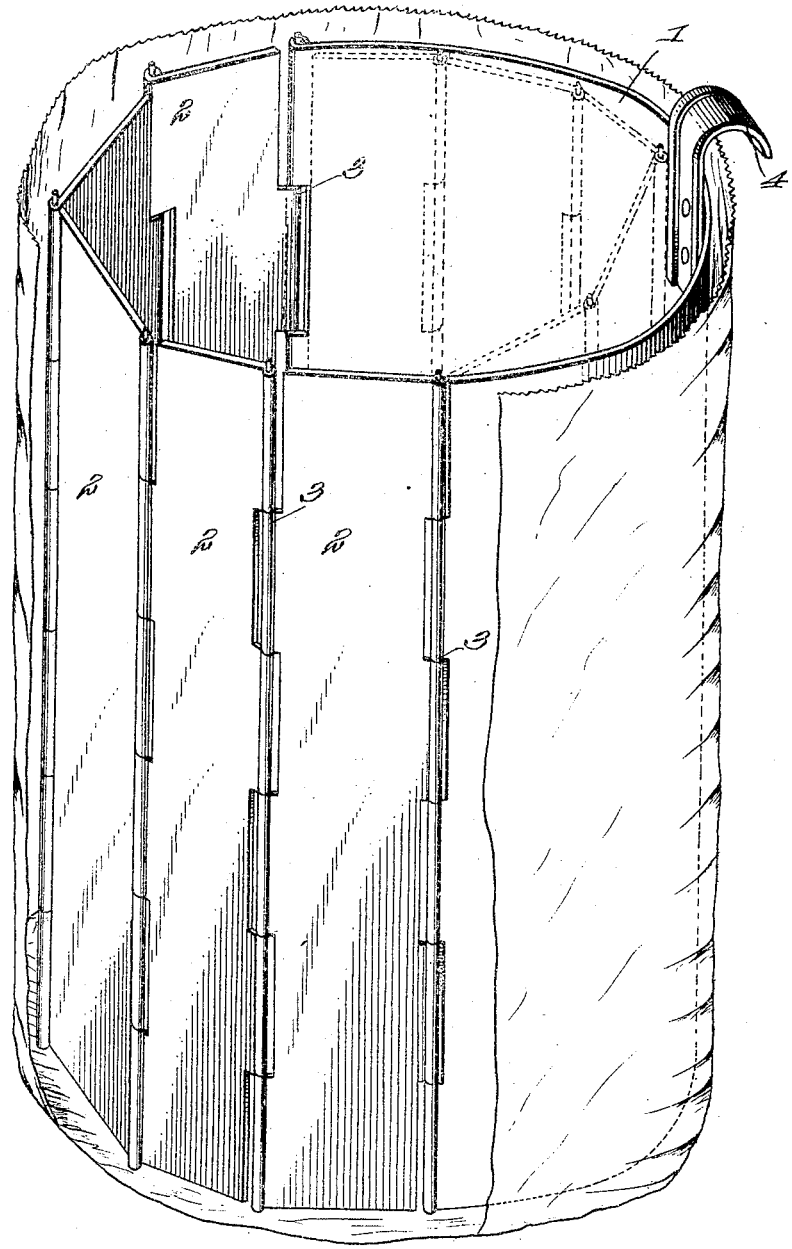
C. A. Shumate, Inventor
Witnesses
By H. B. Willson, Attorney No. 770,935. Patented September 27, 1904.

UNITED STATES PATENT OFFICE.

CHARLES A. SHUMATE, OF WAPAKONETA, OHIO.

MEASURE.

SPECIFICATION forming part of Letters Patent No. 770,935, dated September 27, 1904.

Application filed March 31, 1904. Serial No. 200,919. (No model.)

*To all whom it may concern:*

Be it known that I, CHARLES A. SHUMATE, a citizen of the United States, residing at Wapakoneta, in the county of Auglaize and State of Ohio, have invented certain new and useful Improvements in Measures; and I do declare the following to be a full, clear, and exact description of the invention, such as will enable others skilled in the art to which it appertains to make and use the same.

My invention is an improved measure adapted for use by grocers and others for measuring dry substances—such as meal, flour, feed, or the like—in sacks, bags, and other vessels; and it consists in the construction and arrangement of devices hereinafter described and claimed.

The accompanying drawing is a perspective view of a measure embodying my improvements, showing the same in use in a paper sack, the latter being partly broken away.

My improved measure is an endless wall composed of a plurality of flexibly-connected sections and may be, as here shown, of cylindrical form when extended or of any other suitable form. It comprises a relatively broad section 1 and a plurality of relatively narrow sections 2, which are hingedly connected, as at 3. Thereby the narrow sections can be folded or disposed in the relatively broad section or extended upwardly therefrom. This enables the measure to be readily placed in a sack or other vessel and to be as readily withdrawn therefrom. The measure is bottomless, and when it is used it is placed in a sack or other vessel and caused to rest on the bottom thereof. The material is then poured into the measure until the same is full, the filling in of the material causing the flexibly-connected sections of the measure to extend downwardly toward the sides of the sack or other vessel, and when the measure has been filled to the required extent it is then drawn upwardly out of the sack or other vessel, leaving the measured material in the latter. To facilitate the manipulation of the measure, the same may be provided with a handle 4, which is here shown as attached to the upper portion of the relatively broad section 1 thereof.

From the foregoing description, taken in connection with the accompanying drawing, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A bottomless measure comprising a relatively broad section and a plurality of relatively narrow sections, the said sections being flexibly connected together, so that the relatively narrow sections may be turned into the relatively broad section.

In testimony whereof I have hereunto set my hand in presence of two subscribing witnesses.

CHARLES A. SHUMATE.

Witnesses:
R. C. STUEVE,
W. H. STUEVE.